Jan. 7, 1969 A. STANGL 3,420,503

DEVICE FOR MAKING A CONTROLLED DESCENT

Filed Aug. 22, 1967

INVENTOR.
ANTON STANGL
BY
Morw, Altman & Oates

ATTORNEYS

United States Patent Office 3,420,503
Patented Jan. 7, 1969

3,420,503
DEVICE FOR MAKING A CONTROLLED DESCENT
Anton Stangl, 27 Egramont Road,
Brighton, Mass. 02135
Filed Aug. 22, 1967, Ser. No. 662,333
U.S. Cl. 254—154   1 Claim
Int. Cl. A62b 1/08

ABSTRACT OF THE DISCLOSURE

A reel of flexible wire or the like is rotatably mounted within a housing strapped to the body. A hand-operated clutch is employed to control the reel and the rate of descent of the wearer when the wire is secured to a fixed object. The device is useful whenever there is a need for a person to lower himself from a height as in mountain climbing or the like.

BACKGROUND OF THE INVENTION

Field of the invention

This invention relates generally to mechanisms for lowering objects by means of a line and more particularly is directed towards a new and improved compact apparatus which is worn on the person for lowering himself at a desired rate of descent from an elevated position.

Description of the prior art

Reeled line mechanisms that are attached to the person for making a descent from a height have been known for many years. However, heretofore devices of this sort have not been entirely satisfactory for various reasons. Such units customarily are mechanically complicated, are difficult to operate and do not provide adequate control over the rate of descent. Also, such units have been relatively expensive and not suited for a wide range of uses. It is, therefore, an object of this invention to provide apparatus of this class which is of simple yet highly efficient construction and one which is fabricated at a low cost and yet is completely reliable in operation.

SUMMARY OF THE INVENTION

The present invention features an apparatus used in making a descent from an elevated position, comprising a housing which is strapped to the body with a fixed shaft which is threaded at least at one end thereof and carries a rotatable reel. Fixed to the reel is a collar, the end of which serves as a brake or clutch surface when engaged by a cooperating surface of a crank handle threaded to the end of the shaft. A wire is wrapped about the reel and is threaded out through the housing. The end of the wire is provided with connecting devices for securing the free end to a fixed object so that the wearer, with the device strapped to him, may lower himself from an elevated position and control his rate of descent by operation of the crank handle. This invention also features a novel mechanism for rewinding the wire onto the spool.

DESCRIPTION OF THE PREFERRED EMBODIMENT

Figure 1:
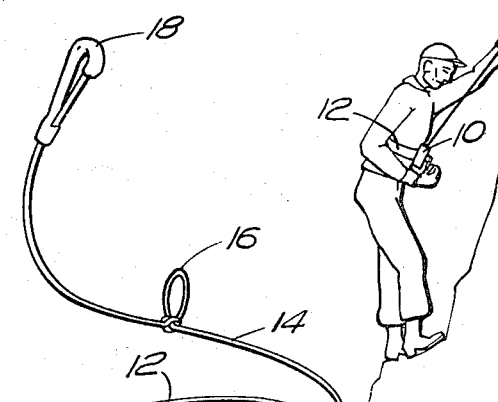
FIG. 1 is a view in perspective of an apparatus made according to the invention and in typical use.

Referring now to the drawings and to FIG. 1 in particular there is shown a descent mechanism generally indicated by the reference character 10 in use by a mountain climber for the purpose of lowering himself from an elevated position. The device 10 is strapped around the chest of the wearer by means of a harness 12 and a length of line 14, preferably a strong braided wire, for example, is secured at its free end to a fixed abutment by means of a loop formed by a ring 16 and a snap hook 18. The wire is wound about a reel 20 rotatably mounted within a housing 22 and the wire is fed out of the housing at a rate controlled by means of a crank 24 operated by the wearer.

Figure 2:
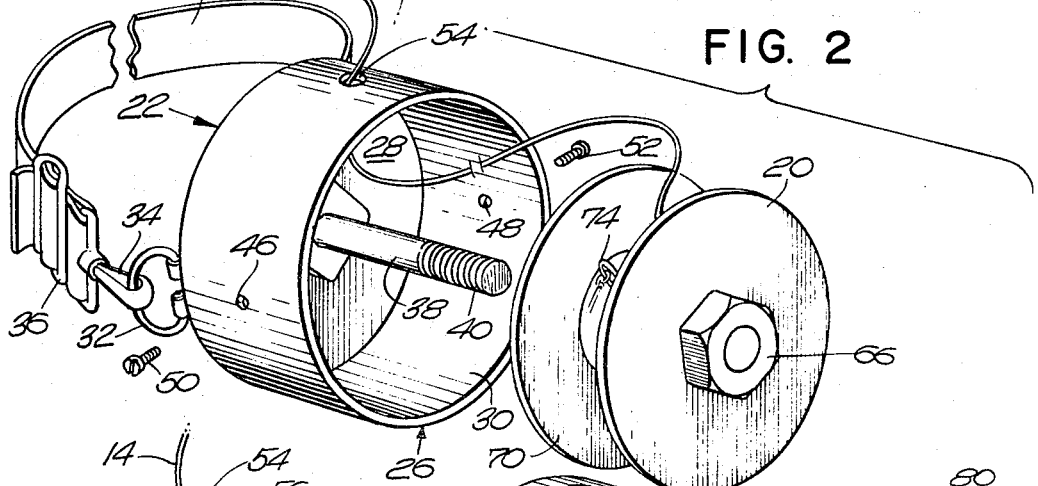
FIG. 2 is an exploded perspective view thereof, and,
FIG. 3 is a sectional view in side elevation thereof.
Figure 3:
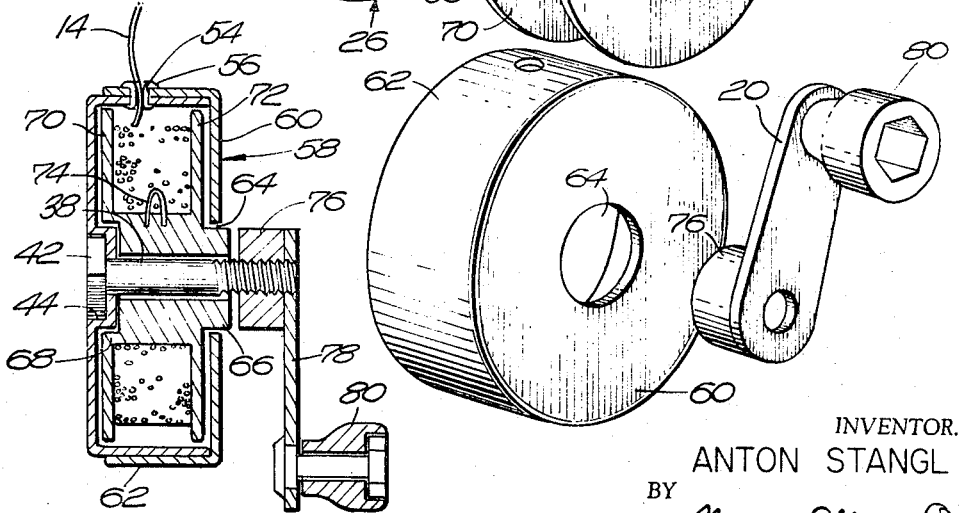

Referring now more particularly to FIGS. 2 and 3, the device will be described in detail. In general the mechanism is organized about the housing 22 which is comprised of a cylindrical main housing 26 having a rear wall 28 and surrounding side walls 30. The main housing 26 is provided with swivel eyes 32 on either side thereof adapted to engage snap hooks 34 on opposite ends of the harness 12. The harness 12 is provided with an adjustment buckle 36 whereby the harness may be adjusted to different sizes. As indicated previously the harness serves to strap the unit around the chest of the wearer with the unit at the front.

Extending centraly from the rear wall 28 of the main housing 26 is a rigid shaft 38, the midportion of which is smooth while the outer end is threaded at 40. Typically the shaft 38 is a bolt having a head 42 which is received in and welded to a countersunk recess 44 formed in the rear wall 28. By countersinking the head of the bolt in this fashion the back surface of the unit, as best shown in FIG. 3, will be flat and smooth and the head will not in any way interfere or be discomforting to the person wearing the unit.

The surrounding side walls 30 of the main housing 26 are formed with tapped openings 46 and 48 located diametrically opposite one another to receive locking screws 50 and 52. The side walls 30 are also formed with an opening 54 the top thereof to accommodate the wire 14 which passes out of the housing at that point. In practice, the opening 54 may be provided with a grommet 56 of a suitable low friction material such as Teflon or the like.

Closing the open end of the housing 26 is a cover 58, also of cylindrical configuration, having an end wall 60 and surrounding annular side walls 62. The cover is dimensioned to fit over the outer surface of the housing side walls 30 to be locked in place by means of the locking screws 50 and 52. The cover 58 is formed with a central opening 64 through which extends a hub 66 for the reel 20 rotatably mounted about the shaft 38.

The reel, which is located in the housing, is formed with radial flanges 70 and 72 which extend outwardly from the hub and are spaced from the front and rear walls of the housing. The diameter of the reel is slightly less than the inside diameter of the housing to provide maximum capacity for the wire 14 which passes through the opening 54 and is wound about in a coil on the reel.

Fixed on the hub of the reel is a small wire hoop 74 which serves to anchor the inner end of the wire 14 against rotation. In practice, when the unit is being assembled, the wire is passed one turn about the hub of the reel with the free end passing through the hoop 74. The wire is then knotted and the reel is wound to form the coil. As the reel is wound the hoop 74 will hold the wire against free spinning and will insure that it is wound properly about the hub of the reel. It will be noted that the hop is arched to insure, that the wire, during the initial phases of the winding, will be guided either to the right or to the left of the hoop and will not bind against the top of the hoop thus insuring maximum density of coiling.

As best shown in FIG. 3, it will be seen that the hub 66 extends out through the cover opening 64 to some extent. Threaded onto the threaded end portion 40 of the shaft 38 is a nut 76. The nut 76 is secured to the end of a crank arm 78 having a socketed handle 80. It will be understood that by moving the crank arm 78 clockwise as viewed in FIG. 2 the nut will move up against the outer end of the hub 76 and engage it in braking engagement. Thus as the wearer descends from his elevated position the wire 14 will feed out from the opening 54 and the speed at which the reel unwinds will be controlled by means of the position of the nut 76 with respect to the hub 66. The shaft 38 is fixed and the reel rotates as long as it is not engaged by the nut. In practice, the wire is wound about the reel in a clockwise direction so that when the reel unwinds it will move in a counterclockwise direction which is opposite to the tightening movement of the nut. This will insure quicker and more positive braking action between the nut and the hub 66. Also in practice, the nut will not be completely free of the hub nor will it be tight against it except when the wearer decides to stop at a particular position. Rather the nut will be in only light pressure engagement with the hub as determined by the wearer as he descends. It will be understood that the wearer will find a particular rate of descent to be most desirable for particular conditions and his unit may be so adjusted by proper manipulation of the crank arm and the nut which with the hub serve as a clutch or slip brake.

As a means for rewinding the reel in a quick and easy fashion the outer surface of the hub 66 as it extends out of the housing is faceted, typically in a hex shape, whereby the socketed handle 80 may be connected by merely turning the crank 78 counterclockwise to disengage the nut and then slip the socketed handle 80 down over the threaded end of the shaft onto the faceted hub 66. By then turning the crank arm the wire may be rewound onto the reel.

The device disclosed herewith is a very rugged and reliable unit which may be fabricated at low cost and yet provides complete control over the speed of descent by the wearer. It may be used for many different applications such as mountain climbing, as a fire escape device or by personnel being lowered from hovering helicopters or the like. Not only may the wearer employ the unit to lower himself from an elevated position but also he may use it to lower an object or another person who is not able to manipulate the unit. For example, the free end of the wire may be looped about a child and the mechanism may be strapped to an adult who will then lower the child at a controlled speed from a window. Once the child has reached the ground the wire may be rewound and the wearer may then lower himself. Many other uses will appear to those skilled in the art.

Having thus described the invention, what I claim and desire to obtain by Letters Patents of the United States is:

1. A self-lowering device, comprising
   (a) a housing,
   (b) harness means for attaching said housing across the chest portion of a person,
   (c) a fixed shaft mounted to said housing and having a threaded end extending through a wall of said housing,
   (d) a reel rotatably mounted to said shaft and within said housing,
   (e) a length of line wound about said reel and passing out through said housing,
   (f) said reel being formed with a hub a portion of which extends out through said wall,
   (g) a nut threaded on said threaded end, and,
   (h) a crank arm fixed to said nut for turning said nut into and out of braking engagement with said hub,
   (i) the portion of said hub extending through said wall being faceted and the outer end of said crank arm being formed with a cooperating socket for rewinding said reel.

References Cited

UNITED STATES PATENTS

| | | | |
|---|---|---|---|
| 604,141 | 5/1898 | Dyer. | |
| 612,673 | 10/1898 | Reidy | 254—154 |
| 2,576,755 | 11/1951 | Gaskins | 254—154 |
| 2,585,876 | 2/1952 | Thoennes | 254—154 |
| 3,265,361 | 8/1966 | Mayrath | 254—187 |
| 3,325,147 | 6/1967 | Carlson | 254—154 |

IVAN C. BLUNK, *Primary Examiner.*

HARVEY C. HORNSBY, *Assistant Examiner.*

U.S. Cl. X.R.

188—71; 254—186